April 4, 1961

C. E. CHAMPION 2,978,693

ANALOG TO DIGITAL CONVERSION SYSTEM

Filed Nov. 10, 1955

INVENTOR.
CARL E. CHAMPION
BY
Ell Woodbury
ATTORNEY

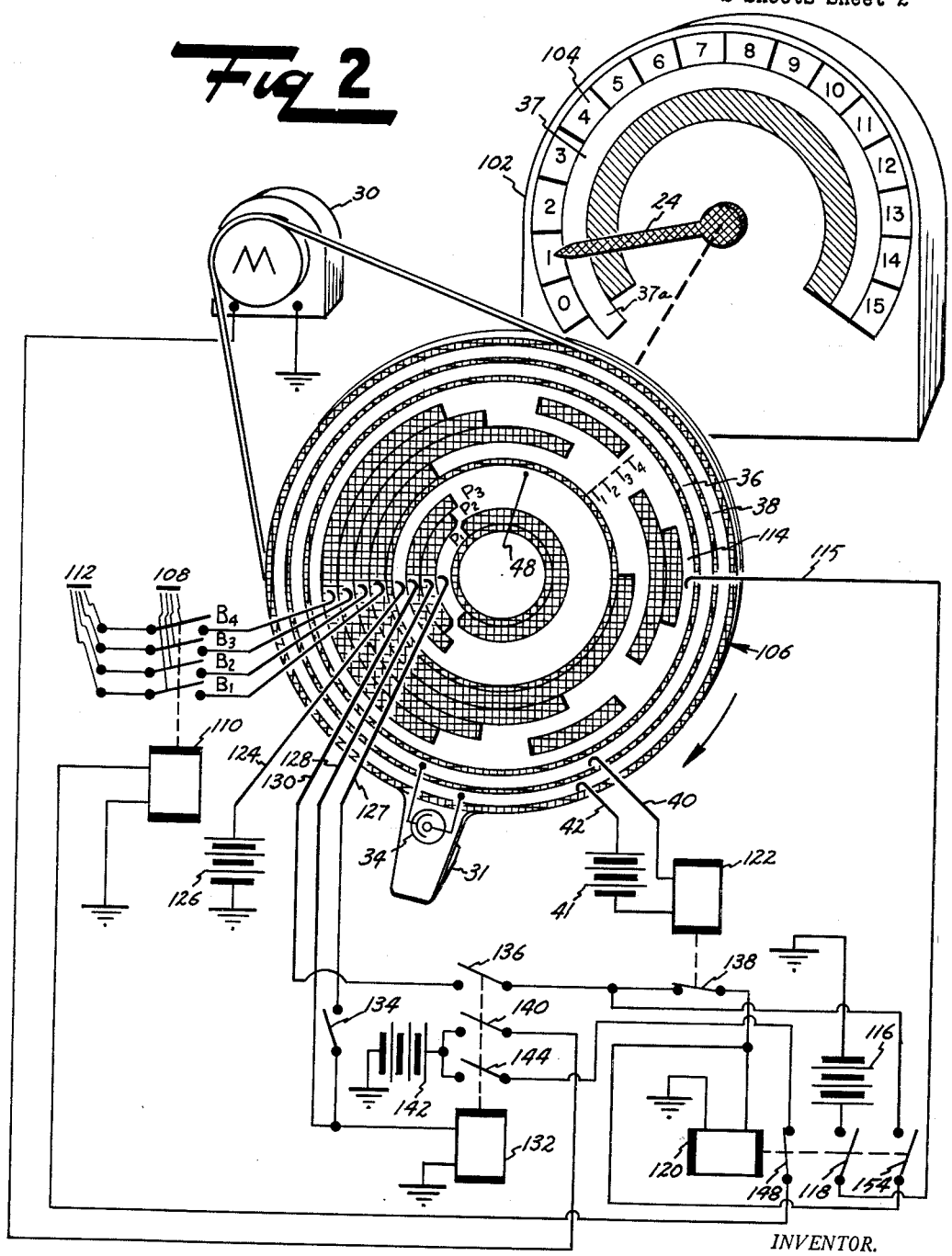

United States Patent Office 2,978,693
Patented Apr. 4, 1961

2,978,693

ANALOG TO DIGITAL CONVERSION SYSTEM

Carl E. Champion, Hollywood, Calif., assignor to The Bendix Corporation, a corporation of Delaware Filed Nov. 10, 1955, Ser. No. 546,048

2 Claims. (Cl. 340—347)

This invention relates to systems for converting analog values, indicated by the position of an element such as a meter pointer, directly into code signals.

At the present time, a large number of electrical systems utilize digital codes for representing numerical information, and many devices have been developed for translating such information into code. There remains, however, a need for a practicable system to translate meter readings directly into electrical code signals.

Briefly, the present invention is a system for directly translating, into digital code signals, readings of a meter of the type having a fixed scale and an indicating element such as a pointer movable with respect to the scale. A scanning system scans the face of the meter and senses the position of the pointer. A code generator operating in synchronism with the scanning system successively forms different digital code signals corresponding to successive values on the meter scale as they are scanned. When the pointer is sensed, the corresponding code signal formed by the generator is gated to an external circuit.

An object of the invention is to provide an improved system for translating meter readings into code signals.

Another object is to provide apparatus for reading a meter and translating the reading into code signals without affecting the operation of the meter.

Other and incidental objects and features of the invention will appear from the following description with reference to the drawings.

Fig. 2 is a schematic circuit and pictorial diagram of another system in accordance with the invention.

Figure 1:
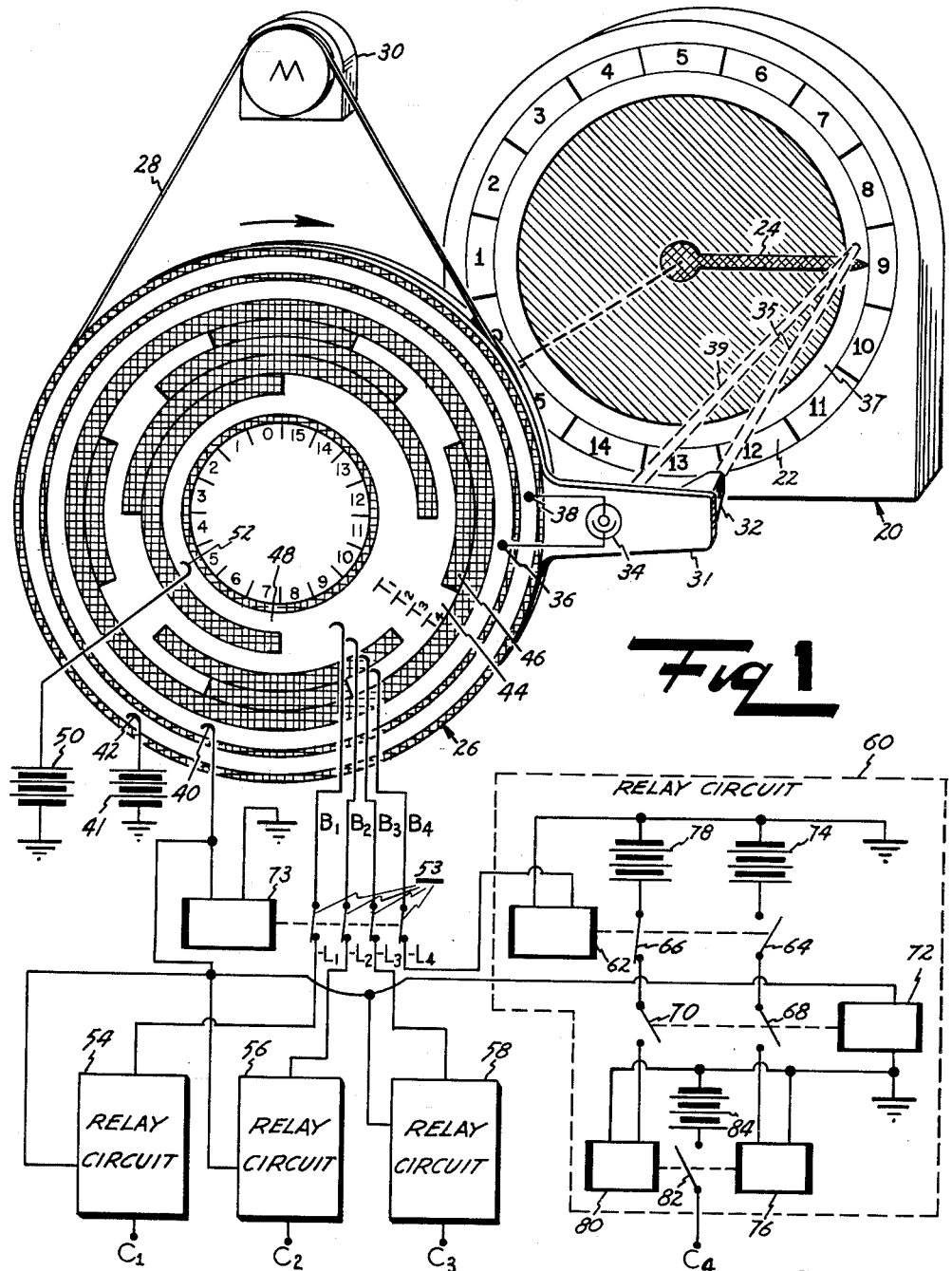
Fig. 1 is a schematic circuit and pictorial diagram of one system in accordance with the invention.

The system of Fig. 1 includes a meter 20 having a scale 22 and an indicating element or pointer 24 rotatively movable over the scale 22 to indicate various values (from one to fifteen, in this instance). The meter may be of any type in which a pointer is used to indicate the measured quantity.

Positioned in axial alignment with the pointer 24 of the meter 20 is a coding disk 26, which is rotated by a motor 30 through a belt 28 in a clockwise direction.

Mounted upon the outer periphery of the coding disk 26 is an extension 31 holding a source of electromagnetic energy, here shown as a light source 32, and a photoelectric cell 34. The light source 32 casts a beam of light 35 upon the meter face 22. The meter face 22 includes a zonal area 37 having a highly reflective surface, to reflect the light beam 35 back, as a reflected beam 39, onto the photo cell 34. As the coding disk 36 revolves, the reflective zone 37 of the meter face 22 is scanned by the light beam 35. The pointer 24 has poor light-reflecting qualities, and when the light beam 35 impinges upon it, substantially no light is reflected to the photo cell 34, and the current therethrough decreases, thereby sensing the scanning of the pointer 24.

The photo-electric cell 34 is connected between annular conductive tracks 36 and 38 on the coding disk 26. Contacting the tracks 36 and 38, respectively, are brushes 40 and 42. Brushes 40 and 42, therefore, constitute the terminals of the photo-electric cell 34. The brush 42 is connected to a battery 41.

The coding disk 26 also has four code-forming, segmented, annular tracks $T_1$–$T_4$, each of which contains conductive segments (e.g., segment 44) and non-conductive segments (e.g., segment 46). The tracks are contacted by respective brushes $B_1$–$B_4$.

The disk 26 is divided into 16 sectors number from 0 to 15, inclusive, as indicated in the drawing. Depending upon which of the sectors 0 to 15 is contacted by the brushes $B_1$–$B_4$, different binary code signals representative of values from 0 to 15 will be applied to the brushes according to the presence or absence of conducting segments under the respective brushes. For example, if the sector 4 is observed, binary signals indicative of the value four will be formed. The annular track $T_1$ forms the most significant digit of a four-digit parallel binary code, and the remaining tracks $T_2$, $T_3$, and $T_4$, respectively, form the less significant digits. The occurrence of a conducting segment in the active sector indicates the binary value "1," while the occurrence of a non-conducting segment indicates the binary value "0."

The decimal values and the corresponding binary code signals are set out in the following table:

| Decimal value: | Binary code |
|---|---|
| 0 | 0000 |
| 1 | 0001 |
| 2 | 0011 |
| 3 | 0010 |
| 4 | 0110 |
| 5 | 0111 |
| 6 | 0101 |
| 7 | 0100 |
| 8 | 1100 |
| 9 | 1101 |
| 10 | 1111 |
| 11 | 1110 |
| 12 | 1010 |
| 13 | 1011 |
| 14 | 1001 |
| 15 | 1000 |

The coding disk 26 is also provided with a slip ring 48 which is connected by a brush 52 to a battery 50. The slip ring 48 is connected to all of the conducting segments located in the tracks $T_1$–$T_4$.

The brushes $B_1$–$B_4$ are adapted to be connected by contacts 53 of a relay 73 and lines $L_1$–$L_4$, respectively, to relay circuits 54, 56, 58, and 62. Relay 73 is normally energized through the photo cell 34 from the battery 41.

The relay circuits 54, 56, 58, and 60, are all alike; therefore, only the circuit 60 is shown in detail. It contains a relay 62 connected between line $L_4$ and ground. The line $L_4$ is connected to the brush $B_4$ sensing the annular track $T_4$ when the switches 53 are closed. The relay 62, when energized, closes normally open contacts 64, and opens normally closed contacts 66. The contacts 64 and 66, respectively, are serially connected with the normally open contacts 68 and 70 of a relay 72 which is energized by current passing through the photo-electric cell 34, and is energized except when the light beam 39 is interrupted by the pointer 24 of the meter.

The contacts 64 and 68 control the connection of a battery 74 to a relay 76, and the contacts 66 and 70 control the connection of a battery 78 to a relay 80. The relay 76, upon being energized, closes contacts 82 which connect a battery 84 to an output terminal $C_4$. The relay 80, upon being energized, opens the contacts 82, thereby disconnecting the battery from the terminal $C_4$.

As shown in the drawing, the pointer 24 is in position to indicate nine as the value sensed by the meter 20. Once during each revolution of the coding disk 26 the light beam 35 is intercepted by the non-reflective pointer 24. At all other times, the photo-electric cell 34 is fully illuminated by the light beam 39, rendering the photo-electric cell conductive, to pass current from the battery 41 through the brush 42 to the track 38, through the photo-electric cell 34, the track 36, and through the brush 40 to the relays 72 and 73, energizing them.

Energization of the relay 73 opens its contacts 53, preventing the binary signals on the brushes $B_1$–$B_4$ from being applied to the lines $L_1$–$L_4$.

Upon interception of the light beam 35 by the pointer 24, the beam 39 to the photo-electric cell 34 is cut off, reducing the current passed by the cell sufficiently to de-energize the relays 72 and 73 and close the contacts 53, 68, and 70.

During the interval when the contacts 53, 68, and 70 are closed, the brushes $B_1$–$B_4$ (as shown in the drawing) are positioned upon, i.e., sensing, the sector 9 of the coding disk 26, and the brushes $B_1$, $B_2$, and $B_4$, are connected to the battery 50, since they rest on conductive segments of the tracks $T_1$, $T_2$, and $T_4$, respectively. The brush $B_3$, however, is not connected to the battery, since it rests on a non-conducting segment in the track $T_3$. Since a current pulse represents a "1" digit and a no-current pulse represents a "0" digit, the binary code 1101 indicating a valve of nine is set up on the brushes $B_1$–$B_4$, and is applied over the closed contacts 53 to the lines $L_1$–$L_4$.

The code signals set up in the lines $L_1$–$L_4$ each time the pointer 24 is sensed may be utilized in various manners. However, it may be desirable to preserve the signals until the pointer is again sensed; i.e., until another reading is taken during the next scanning cycle. The relay circuits 54, 56, 58, and 60, perform this function.

Upon energization of the line $L_4$, for example, indicating a "1" digit for the least significant digit position, the relay 62 will be energized to close the contacts 64 and open the contacts 66. At the same time, the relay 72 will be de-energized, closing the contacts 68 and 70. With both switches 64 and 68 closed, a current path is completed from the battery 74 to energize the relay 76, thereby closing the contacts 82 and applying voltage from battery 84 to the terminal $C_4$. The contacts 82 remain in the position to which last actuated, until altered by energization of either the relay 76 or the relay 80. The relays 76 and 80 can be energized only during the time when the pointer 24 is sensed, because of the contacts 68 and 70. Therefore, a voltage at the terminal $C_4$ will be preserved to indicate the value of the last-sensed signal.

Assume now, for example, that a code value is sensed in which no current exists in the line $L_4$ indicating a "0" value for the least significant digit of the binary number formed. During such an interval, the relay 62 will not be energized, and therefore the contacts 66 will remain closed while the contacts 64 remain open. Under these conditions, de-energization of the relay 72 completes a circuit from battery 78 over contacts 66 and 70 to energize the relay 80 and open the contacts 82. With the contacts 82 open, no voltage is applied to the terminal $C_4$, thereby indicating a "0" digit.

The operation of the relay circuits 56, 58, and 60 being similar to the operation of the relay circuit 54, it may be seen that the relay circuits 54, 56, 58, and 60, function jointly to preserve, or store, the last binary code until the pointer 24 is again scanned.

The system shown in Fig. 2 is a start-stop system adapted for use in conjunction with a meter having a deflection angle of 250 degrees. In Fig. 2 elements similar to elements of Fig. 1 carry like reference numbers.

The system of Fig. 2 includes a meter 102 having a scale 104, a pointer 24, and a reflective zonal area 37. The scale 104 covers an angle of 250°. The reflective area 37 is generally co-extensive with scale but extends slightly therebeyond at the low end.

Positioned in axial alignment with the pointer 24 is a coding disk 106. The coding disk contains annular coding tracks $T_1$–$T_4$, which are similarly coded to the tracks $T_1$–$T_4$ of Fig. 1, except that the tracks of the disk 106 are compressed into an angular segment of 250°. The coding disk 106 also carries slip rings 36 and 38 and program tracks $P_1$–$P_3$. The program tracks $P_1$–$P_3$ are utilized for controlling the start-stop operation of the disk. The disk 106 carries an extension 31 containing a light source (not shown), and a photo-electric cell 34 for scanning the zonal area 37.

Brushes $B_1$–$B_4$ contact the annular tracks $T_1$–$T_4$ and are connectible via contacts 108 of a relay 110 to output terminals 112. The conductive segments of the tracks $T_1$–$T_4$ are in electrical contact with each other and with a slip ring 114. The slip ring 114 is connectible to a battery 116 through a brush 115 and a contact 118 of a relay 120.

The slip rings 36 and 38 are contacted by brushes 40 and 42 respectively, between which are connected a battery 41 and a relay 122.

The program tracks $P_1$–$P_3$ are energized by means of a slip ring 48 which is in contact with a brush 124 which is in turn connected to a battery 126. The program tracks $P_1$–$P_3$ are contacted by brushes 127, 128, and 130, respectively. The brush 127 is connected through a start switch 134 to a relay 132; the brush 128 is connected to the relay 132; and the brush 130 is connected through contacts 136 of the relay 132, and contacts 138 of relay 122, to the relay 120.

Contacts 140 of the relay 132 selectively connect a battery 142 to the motor 30. Contacts 144 are serially connected with the battery 142, contacts 148 of the relay 120, and the relay 110. Contacts 154 of the relay 120 provide a holding circuit for it to maintain the relay 120 energized after the contacts 138 open.

In the quiescent condition of the system of Fig. 2, the coding disk 106 is in a start position in which the conductive segment of track $P_2$ has left brush 128, and brush 127 is on the conductive segment of track $P_1$. Upon closure of the start switch 134, which may be effected automatically or manually, an electrical current flows from the battery 126, through the brush 124, and through the conducting segments of the program tracks and the brush 127, and the start switch 134 to the relay 132. The start switch 134 is closed only for a short time since, as will appear later, initial movement of the coding disc 106 completes a circuit holding the relay 132 energized through one revolution. Energization of the relay 132 closes the contacts 140 providing a current path from the battery 142 to the motor 30, starting the coding disk 106 turning in clockwise direction. After a slight amount of turning, the brush 127 rides onto a non-conducting area of the program track $P_1$, and current to brush 127 is cut off. However, simultaneously with this occurrence, the brush 128 passes onto a conducting segment of the program track $P_2$ and provides a holding path for the relay 132, after the start switch 134 has been opened.

Energization of the relay 132 also closes the contacts 144, providing a current path from the battery 142, through the normally closed contacts 148 of relay 120, to the relay 110.

Energization of the relay 132 also closes the contacts 136, which are connected to the brush 130, which contacts a conductive segment of the programming track $P_3$ during the period when the meter is scanned. Slightly prior to the beginning of the scanning period, the photo-electric cell 34 receives reflected light from the extended portion 37a of the zonal area 37 and presents a reduced resistance, allowing energization of the relay 122 which breaks the contacts 138. It may therefore be seen, that, at the beginning of the scanning period, the relays 110, 122, and 132, are energized; however, the relay 120 is unenergized, maintaining the annular tracks $T_1$–$T_4$ de-energized.

At the instant of scanning of the pointer 24, i.e., when the light beam from the lamp in extension 31 falls upon the pointer (which has a non-light-reflecting surface), the illumination of and the current through the photo cell 34 are reduced sufficiently to de-energize the relay 122, thereby allowing contacts 138 to close. With closure of the contacts 138, the relay 120 is energized, closing its contacts 154, and thereby providing a holding circuit from the contacts 136 through the relay 120 to maintain the latter energized when the relay 122 is again energized to open its contacts 138. The relay 120 remains energized over its own contacts 154 until the relay 132 is de-energized to open the contacts 136. Energization of the relay 120 also closes the contacts 118, connecting the battery 116 to the brush 115, and thereby applying a voltage to the conductive segments of the annular tracks $T_1$–$T_4$. The code signals are formed at this instant in a manner similar to that described with reference to Fig. 1, and appear at the terminals 112.

The energization of the relay 120 also opens the contacts 148, releasing the relay 110 to open the contacts 108. It is to be noted that the application of a voltage to the conductive segments of the tracks $T_1$–$T_4$ occurs simultaneously with the de-energization of the relay 110. However, the relay 110 is a slow-release relay and maintains its contacts 108 closed for an interval after current flow ceases. During this interval, the code is read from the coding disk tracks $T_1$–$T_4$ to the terminals 112.

The coding disk 106 continues to revolve until the brush 128 rides onto a non-conducting segment of the program track $P_1$ and opens the energizing circuit of the relay 132, opening the contacts 136, 140, and 144. The opening of the contacts 140 stops the motor 30 and the coding disk 106. The opening of the contacts 136 releases the relay 120, restoring the system to its quiescent state.

Summarizing, closure of the starting switch 134 initiates a cycle of operation during which the coding disk 106 makes one revolution to sense the position of the pointer 24 and set up digital code signals indicative thereof at the terminals 112.

An important feature of the invention is the optical system requiring on the meter 20 only a pointer and background (the reflective zone 37) of different light-reflecting properties. The mass of the moving element is not changed, and standard meters can readily be adapted for use. Obviously, if desired, the pointer can be made reflective and the zone 37 non-reflective.

Although for the purpose of explaining the invention particular embodiments thereof have been shown and described, obvious modifications will occur to a person skilled in the art, and I do not desire to be limited to the exact details shown and described.

I claim:

1. A code signal-forming system comprising: a dial face; an indicating element adapted to be moved relative to said dial face to manifest different quantities; scanning means for continuously scanning said entire dial face to form an indicating signal during the interval when said indicating element is scanned; a coding device for forming different independent code signals in a predetermined sequence in synchronism with said scanning of said dial face; an output circuit; a switching circuit controlled by said indicating signal for applying a code signal from said coding device to said output circuit only during said interval when said indicating element is being scanned; and control means programmed by the position of said scanning means for controlling said scanning means; said switching circuit comprising means responsive to said control means for connecting said coding device to said output circuit at the start of scanning and continuously maintaining said connection until said interval when said indicating element is being scanned, means responsive to said indicating signal for energizing said coding device, and means for disconnecting said coding device from said output circuit in response to and immediately following energization of said coding device.

2. In combination: an instrument having a flat opaque background element and an indicating element close to and in front of said background element and rotatable in a fixed path concentric about an axis normal to said flat background element; scanning means rotatable through a scanning path juxtaposed to and in front of said fixed path, said scanning means comprising projecting means for projecting a beam of electromagnetic energy onto said fixed path and receiving means responsive to received energy for producing an electric current proportional thereto, said projecting means and said receiving means being positioned side by side in a plane radial to said axis for direct reception by said receiving means of energy from said beam that is reflected by said indicating element and the background element in a path approximately parallel to said beam; means for moving said scanning means to sweep said beam along said fixed path; and means responsive to a change in said current for producing a signal indicative of the position of said scanning means in said scanning path at the instant of change; said background and the indicator element having different reflective characteristics such that the energy received by said receiving means varies in intensity when said indicating element is scanned by said beam.

References Cited in the file of this patent

UNITED STATES PATENTS

| | | |
|---|---|---|
| 2,110,746 | Tolson | Mar. 8, 1938 |
| 2,419,487 | Dresser | Apr. 22, 1947 |
| 2,491,591 | Sweeny | Dec. 20, 1949 |
| 2,503,052 | Keinath | Apr. 4, 1950 |
| 2,575,342 | Gridley | Nov. 20, 1951 |
| 2,770,798 | Roth | Nov. 13, 1956 |
| 2,784,397 | Branson | Mar. 5, 1957 |
| 2,823,345 | Ragland | Feb. 11, 1958 |

FOREIGN PATENTS

| | | |
|---|---|---|
| 712,316 | France | July 20, 1931 |